United States Patent
Gordan et al.

(10) Patent No.: US 12,361,936 B2
(45) Date of Patent: Jul. 15, 2025

(54) METHOD AND SYSTEM OF AUTOMATED QUESTION GENERATION FOR SPEECH ASSISTANCE

(71) Applicant: Microsoft Technology Licensing, LLC, Redmond, WA (US)

(72) Inventors: Robert Fernand Gordan, San Francisco, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 17/410,136

(22) Filed: Aug. 24, 2021

(65) Prior Publication Data

US 2023/0061210 A1   Mar. 2, 2023

(51) Int. Cl.
G10L 15/22     (2006.01)
G06F 40/40    (2020.01)
G10L 15/18    (2013.01)
G06Q 10/00    (2023.01)

(52) U.S. Cl.
CPC .............. *G10L 15/22* (2013.01); *G06F 40/40* (2020.01); *G10L 15/1822* (2013.01)

(58) Field of Classification Search
CPC .................. G10L 15/22; G10L 15/1822; G10L 2015/226; G06F 40/40; G06F 40/58; G06Q 10/00
See application file for complete search history.

(56) References Cited

U.S. PATENT DOCUMENTS

| | | | |
|---|---|---|---|
| 6,411,932 B1 | 6/2002 | Molnar | |
| 7,778,831 B2 | 8/2010 | Chen | |
| 8,050,922 B2 | 11/2011 | Chen | |
| 8,457,967 B2 | 6/2013 | Audhkhasi et al. | |
| 9,747,897 B2 | 8/2017 | Peng et al. | |
| 9,792,908 B1 | 10/2017 | Bassemir et al. | |

(Continued)

FOREIGN PATENT DOCUMENTS

| | | |
|---|---|---|
| CN | 101551947 A | 10/2009 |
| CN | 107945788 A | 4/2018 |

(Continued)

OTHER PUBLICATIONS

"Non Final Office Action Issued in U.S. Appl. No. 16/560,783", Mailed Date: Feb. 17, 2023, 24 Pages.

(Continued)

*Primary Examiner* — Daniel C Washburn
*Assistant Examiner* — Penny L Caudle
(74) *Attorney, Agent, or Firm* — NovoTechIP International PLLC

(57) ABSTRACT

A method and system for generating one or more questions relating to a presentation session includes receiving audio data from the presentation session, retrieving a transcript for the audio data, receiving other data relating to the presentation session, providing at least one of the transcript and the other data to a machine-learning (ML) model as input for automatically generating the one or more questions relating to the presentation session, receiving from the ML model the one or more questions, and providing the one or more questions for display on a user interface associated with the presentation session.

20 Claims, 11 Drawing Sheets

(56) References Cited

U.S. PATENT DOCUMENTS

| | | | |
|---|---|---|---|
| 10,069,971 | B1 | 9/2018 | Shaw et al. |
| 10,560,492 | B1 | 2/2020 | Ledet |
| 11,341,331 | B2 | 5/2022 | Liao et al. |
| 2002/0120447 | A1 | 8/2002 | Charlesworth |
| 2009/0089062 | A1 | 4/2009 | Lu |
| 2012/0322035 | A1 | 12/2012 | Julia et al. |
| 2013/0231930 | A1 | 9/2013 | Sanso |
| 2014/0356822 | A1* | 12/2014 | Hoque .................. G09B 19/04 434/185 |
| 2015/0310852 | A1 | 10/2015 | Spizzo et al. |
| 2016/0049094 | A1 | 2/2016 | Gupta et al. |
| 2016/0077719 | A1 | 3/2016 | Threewits |
| 2016/0133155 | A1 | 5/2016 | Lee et al. |
| 2016/0253999 | A1 | 9/2016 | Kang et al. |
| 2018/0075145 | A1* | 3/2018 | Zhao .................. G06F 16/367 |
| 2018/0315420 | A1 | 11/2018 | Ash et al. |
| 2019/0361842 | A1 | 11/2019 | Wood et al. |
| 2019/0385480 | A1 | 12/2019 | Suzuki |
| 2020/0135050 | A1 | 4/2020 | Nunez |
| 2020/0184958 | A1 | 6/2020 | Norouzi |
| 2020/0296457 | A1 | 9/2020 | Church et al. |
| 2021/0065582 | A1 | 3/2021 | Liao et al. |
| 2021/0099317 | A1 | 4/2021 | Hilleli et al. |
| 2021/0103635 | A1* | 4/2021 | Liao .................. G06V 40/174 |
| 2021/0103851 | A1* | 4/2021 | Spotanski ............. G06F 40/295 |
| 2021/0118426 | A1* | 4/2021 | Li .......................... G10L 15/04 |
| 2021/0151036 | A1 | 5/2021 | Diment |
| 2021/0312399 | A1* | 10/2021 | Asokan ................ G10L 15/063 |
| 2021/0319786 | A1 | 10/2021 | Kain et al. |
| 2022/0223066 | A1 | 7/2022 | Chen |
| 2022/0230082 | A1* | 7/2022 | Poddar .................. G06N 20/00 |
| 2024/0013790 | A1 | 1/2024 | Li |

FOREIGN PATENT DOCUMENTS

| | | |
|---|---|---|
| CN | 111081229 A | 4/2020 |
| EP | 0953970 A2 | 11/1999 |
| JP | 2016191739 A | 11/2016 |
| KR | 101672484 B1 | 11/2016 |

OTHER PUBLICATIONS

"Final Office Action Issued in U.S. Appl. No. 16/560,783", Mailed Date: Sep. 30, 2022, 20 Pages.

"International Search Report and Written Opinion Issued in PCT Application No. PCT/US22/037092", Mailed Date: Nov. 11, 2022, 9 Pages.

"(How to) Pronounce", Retrieved from: https://web.archive.org/web/20200320093418/apps.apple.com/us/app/how-to-pronounce/id717945069, Mar. 20, 2020, 3 Pages.

"ELSA: Learn And Speak English", Retrieved from: https://apps.apple.com/us/app/elsa-learn-english-speech/id1083804886, Retrieved On: Apr. 18, 2020, 3 Pages.

"English Pronunciation IPA", Retrieved from: https://apps.apple.com/us/app/english-pronunciation-ipa/id939357791, Retrieved On: Mar. 16, 2022, 3 Pages.

"Look Up: Pronunciation Checker & Dictionary", Retrieved from: https://apps.apple.com/us/app/look-up-pronunciation-checker-dictionary/id1217022803, Retrieved On: Mar. 16, 2022, 3 Pages.

"Say It: English Pronunciation", Retrieved from: https://web.archive.org/web/20190828012815/https://apps.apple.com/us/app/say-it-english-pronunciation/id919978521, Aug. 28, 2019, 3 Pages.

"International Search Report and Written Opinion Issued in PCT Application No. PCT/CN21/096621", Mailed Date: Feb. 28, 2022, 10 Pages.

Pearce, James, "English Vocabulary: How to Speak with Fluency Like a Native", Retrieved from: https://web.archive.org/web/20210501023209/https://www.fluentu.com/blog/english/, May 1, 2021, 6 pages.

Audhkhasi, et al., "Formant-Based Technique for Automatic Filled-Pause Detection in Spontaneous Spoken English", In Proceedings of IEEE International Conference on Acoustics, Speech and Signal Processing, Apr. 19, 2009, 4 Pages.

"Applicant Initiated Interview Summary Issued in U.S. Appl. No. 16/560,783", Mailed Date: Jul. 26, 2022, 3 Pages.

"Non Final Office Action Issued in U.S. Appl. No. 16/560,783", Mailed Date: May 5, 2022, 22 Pages.

Kaushik, et al., "Laughter and filler detection in naturalistic audio", In Proceedings of 16th Annual Conference of the International Speech Communication Association, Sep. 6, 2015, pp. 2509-2513.

Kurihara, et al., "Presentation sensei: a presentation training system using speech and image processing", In Proceedings of the 9th international conference on Multi modal interfaces, Nov. 12, 2007, pp. 358-365.

Shangavi, et al., "Self-Speech Evaluation with Speech Recognition and Gesture Analysis", In Proceedings of National Information Technology Conference, Oct. 2, 2018, 7 Pages.

"GPT-3", Retrieved from: https://en.wikipedia.org/wiki/GPT-3, Jun. 28, 2021, 6 Pages.

U.S. Appl. No. 17/415,675, filed May 28, 2021.

Communication under Rule 70(2) and 70a(2) Received for European Application No. 21942358.9, mailed on Feb. 11, 2025, 01 pages.

Final Office Action Issued in U.S. Appl. No. 16/593,724, Mailed Date : Oct. 21, 2021 9 Pages.

Non Final Office Action Issued in U.S. Appl. No. 16/593,724, Mailed Date: Feb. 3, 2021 23 Pages.

Extended European Search Report Received in European Patent Application No. 21942358.9, mailed on Jan. 22, 2025, 09 pages.

Non-Final Office Action mailed on Mar. 18, 2025, in U.S. Appl. No. 17/415,675, 31 Pages.

US-2021-0065582-A1, Mar. 4, 2021.

\* cited by examiner

5 MOST COMMON BIRD SPECIES IN TEXAS

1. American Robins
2. Downy Woodpecker
3. Hairy Woodpecker
4. American Goldfinch
5. House Sparrow

240 —

Potential Question

Which parts of Texas do these birds live in?

242 — 🎤 Practice    244 — Next Question

METHOD AND SYSTEM OF AUTOMATED QUESTION GENERATION FOR SPEECH ASSISTANCE

BACKGROUND

Many people struggle with public speaking, particularly when it involves giving a presentation or a speech. A common method of decreasing nervousness and improving the quality of a person's speech is to practice giving the speech beforehand. This may be done in front of a mirror or by using a computer-based speech rehearsal program. While these types of preparations may be helpful in improving a person's speech and/or decreasing their nervousness, it does not address all the issues that may be encountered during a presentation. For example, in many presentations and meetings, the participants are interested in asking questions from the presenter. This can cause additional uneasiness since many people do not feel comfortable facing unexpected questions. While the presenter may try to prepare for answering questions by thinking of questions that may be asked, they cannot always think of the right questions that come up. Furthermore, even if they anticipate the right questions and try to practice responding to the questions, there are no mechanisms for determining if their responses are appropriate and/or presented in the right way.

Moreover, often presenters cannot gauge whether a response they provided to a question during a meeting or presentation was satisfactory or was presented properly. Without knowing this information, it is difficult for presenters to improve their speech quality as it relates to responding to questions.

Hence, there is a need for improved systems and methods of providing speech rehearsal assistance.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving audio data from a presentation session, retrieving a transcript for the audio data, receiving other data relating to the presentation session, providing at least one of the transcript and the other data to a machine-learning (ML) model as input for automatically generating one or more questions relating to the presentation session, receiving from the ML model the one or more questions, and providing the one or more questions for display on a user interface associated with the presentation session.

In yet another general aspect, the instant disclosure presents a method for generating one or more questions relating to a presentation session. In some implementations, the method includes receiving audio data from the presentation session, retrieving a transcript for the audio data, receiving other data relating to the presentation session, providing at least one of the transcript and the other data to an ML model as input for automatically generating the one or more questions relating to the presentation session, receiving from the ML model the one or more questions, and providing the one or more questions for display on a user interface associated with the presentation session.

In a further general aspect, the instant application describes a non-transitory computer readable medium on which are stored instructions that when executed cause a programmable device to receive audio data from a presentation session, retrieve a transcript for the audio data, receive other data relating to the presentation session, provide at least one of the transcript and the other data to an ML model as input for automatically generating one or more questions relating to the presentation session, receive from the ML model the one or more questions, and provide the one or more questions for display on a user interface associated with the presentation session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 2A-2D depicts example user interface screens of an application or service that provides speech or presentation rehearsal assistance.

DETAILED DESCRIPTION

Figure 1A:
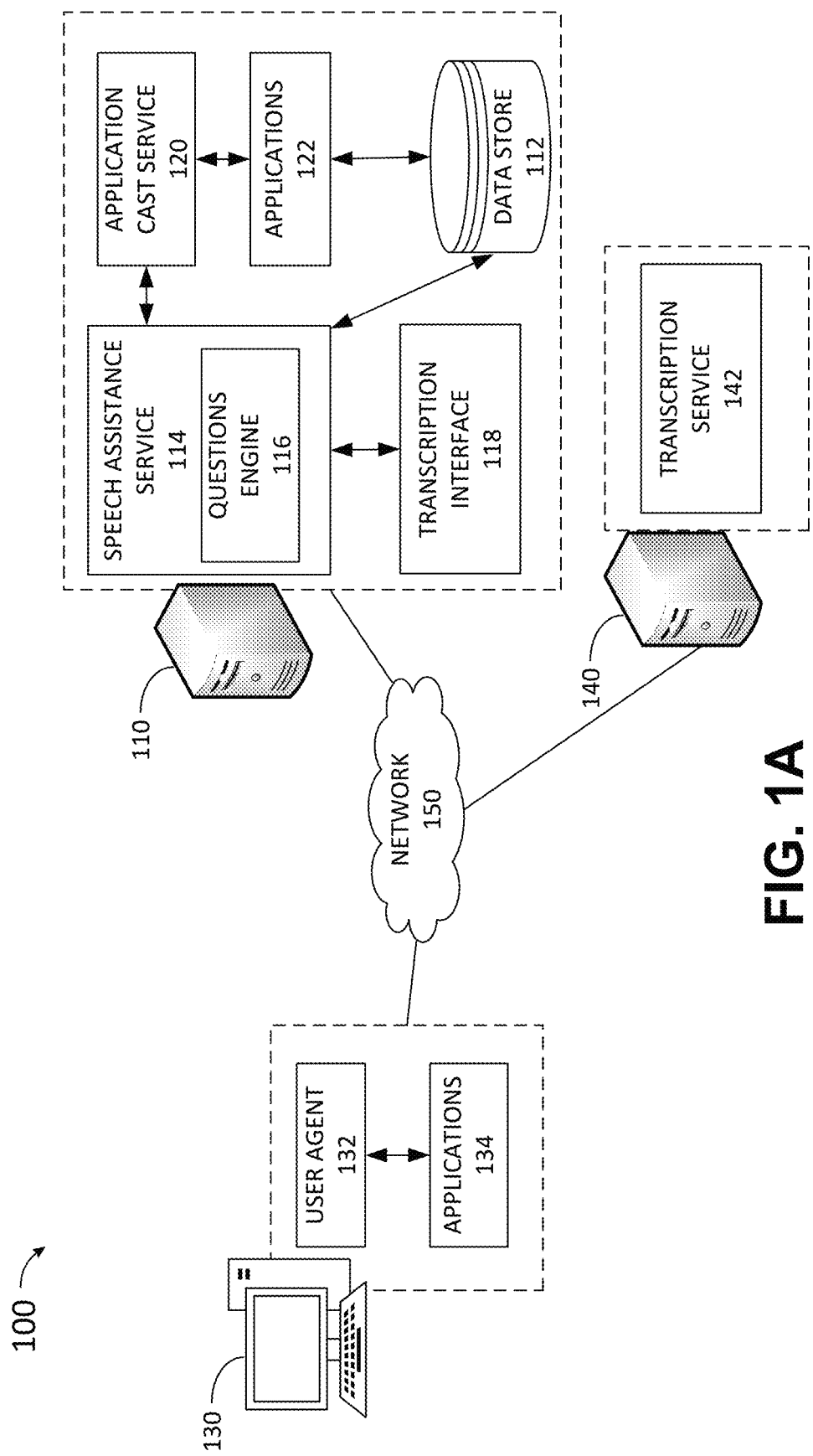
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Fear of public speaking is often ranked as one of people's worst fears. Yet, giving presentations and occasional speeches and participating in meetings is part of many careers and activities, and as such a common occurrence for many people. When a person is nervous or uncomfortable, their normal manner of speaking may be altered without them even realizing it. This is particularly the case when an individual is faced with an unexpected question. In fact, facing unexpected questions can significantly increase a person's uneasiness about public speaking.

A common solution for improving the quality of a presentation or speech is to practice beforehand. This may be done in front of a mirror or by using currently available speech rehearsal technology. While the currently available technologies can help a presenter practice their prepared presentation (e.g., prepared speech) and identify certain speaking issues such as improper speaking pace or speech disfluencies, the currently available technologies do not provide assistance in improving a user's responses to questions. This is a significant disadvantage since responding to questions can be an important aspect of a presentation. Furthermore, even if a presenter attempts to prepare for questions by thinking of questions that may be asked beforehand, they may not be able to anticipate the right questions. Moreover, short of practicing their responses in front of another person (which may only be able to provide a subjective opinion), there is little a person can do to determine if their responses to the anticipated questions are proper. Thus, people are often left with no adequate means for improving their ability to respond to questions during a presentation or speech. As such, there exists a technical problem of lack of adequate mechanisms for anticipating questions and improving responses to questions for improving speech.

To address these technical problems and more, in an example, this description provides technical solutions for intelligently and automatically generating questions that may be asked during a presentation, assessing whether a response to a question is proper, and/or providing feedback on how the response could be improved. This may be achieved by utilizing a speech recognition algorithm that converts spoken words to text in real-time, a machine-learning model extracts data from presentation materials (e.g., extracts text and/or multimedia content), and/or a machine learning model that examines a data set of previous questions and responses to identify a list of one or more questions related to the speech and/or presentation materials. Furthermore, speech processing and/or natural language processing (NLP) algorithms may be used to assess the user's response when responding to a question and/or to provide feedback with respect to the quality of the response. In this manner, the technical solutions enable simulation of an interactive presentation environment.

As will be understood by persons of skill in the art upon reading this disclosure, benefits and advantages provided by such implementations can include, but are not limited to, a technical solution to the technical problems of lack of mechanisms in speech rehearsal technologies for providing assistance in improving a person's ability to properly respond to questions. Technical solutions and implementations provided herein offer a mechanism for anticipating questions based on a person's speech or rehearsal materials, assessing the quality of a response provided and providing feedback on how the response can be improved. The benefits made available by these technology-based solutions provide a user-friendly mechanism for improving a presenter's speech when responding to questions.

As used herein, the terms "speech," may refer to any spoken words uttered by an individual either during a speech rehearsal session or during a live presentation or meeting. Furthermore, as used herein, the term "presenter" may refer to any individual that is speaking either during speech rehearsal session or during a live presentation. The term "presentation session" may be used to refer to a computerized presentation rehearsal session or a virtual meeting.

FIG. 1A illustrates an example system 100, upon which aspects of this disclosure may be implemented. The system 100 may include a server 110 which may be connected to or include a data store 112 which may function as a repository in which datasets relating to training models, data relating to the speech assistance service and/or data relating to applications 122 may be stored. Although shown as a single data store, the data store 112 may be representative of multiple storage devices and data stores which may be connected to each of the speech assistance service 114, applications 122, Application cast service 120 or transcription interface 118. Moreover, the server 110 may include a plurality of servers that work together to deliver the functions and services provided by each service or application. The server 110 may operate as a shared resource server located at an enterprise accessible by various computer client devices such as client device 130. The server may also operate as a cloud-based server for offering speech assistance services in one or more applications such as applications 122 and/or applications 134.

The server 110 may include and/or execute a speech assistance service 114 which may provide intelligent speech improvement services for users utilizing an application on their client devices such as client device 130. The speech assistance service 114 may operate to examine data received from a user's client device via an application (e.g., applications 122 or applications 134), examine the data and provide feedback to the user regarding their speech or presentation to enable the user to improve their speech. The feedback may include a list of one or more questions relating to the user's speech that may be asked of the user in a live presentation session, as well as feedback regarding any responses provided to the questions. The speech assistance service 114 may generate questions and/or evaluate responses to questions by utilizing a questions engine 116.

The questions engine 116 may include one or more Machine learning (ML) models that receive data relating to a presentation session (e.g., either a speech rehearsal session or a live presentation session), analyze the data and generate questions that may be asked by an audience during a live presentation session. In some implementations, to achieve this, the speech assistance service may receive a transcription of audio data received from the presentation session. The audio may include audio captured during a speech rehearsal session, during a live presentation session (e.g., a virtual audio and/or video meeting) or while practicing responding to questions.

The transcription may be provided by a transcription service 142 which is offered by a server 140. The transcription service 142 may be a known audio transcription service that receives audio data and provides a text transcription of the data via one or more ML models. In an example, the audio transcription service is the Azure audio transcription service offered by Microsoft®. In some implementations, a transcription interface 118 acts as an intermediary between the speech assistance service 114 and the transcription service 142. The transcription interface 118 may receive a for transcription services from the speech assistance service 114 and/or application cast service 120 and subsequently make a request for transcription to the transcription service 142. In some implementations, the application cast service 120 handles transmitting requests to various services that perform different functions relating to an application associated with the application cast service. For example, the application cast service 120 may determine that a request for speech rehearsal services has been received via the application 122 or application 134, determine the request requires use of speech transcription services and send a request for transcription services to the transcription service 142 via the transcription interface 118. The application cast service 120 may access the various services via one or more application programming interfaces (APIs).

As a general matter, the methods and systems described herein may include, or otherwise make use of an ML model to transcribe audio data to text, analyze various parameters to generate questions relating to a presentation session, analyze responses to questions to evaluate the quality of the responses and/or analyze various speech parameters. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words and contents (e.g., icons, images, or emoticons) and/or generate questions relating to the content. Such training may be made following the accumulation, review, and/or analysis of data (e.g., user data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

In some implementations, the training mechanism used to train the ML models used by the questions engine 116 may use training datasets stored in the data store 112 or at other locations to provide initial and ongoing training for the models. In one implementation, the training mechanism may use labeled training data from the data store 112 (e.g., stored user input data) to train each of the models via deep neural networks. The initial training may be performed in an offline stage.

The client device 130 may be connected to the server 110 via a network 150. The network 150 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 134). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 5 and 6.

The client device 130 may include one or more applications 134. Each application 134 may be a computer program executed on the client device that configures the device to be responsive to user input to allow a user to provide audio input in the form of spoken words via the application 134. Examples of suitable applications include, but are not limited to, a productivity application (e.g., job searching application that provides a job interview coach or a training application that trains employees such as customer service staff on responding to customers, etc.), presentation application (e.g., Microsoft® PowerPoint®), a document editing application, communications application (e.g. Microsoft® Teams®) or a standalone application designed specifically for providing speech rehearsal assistance.

In some examples, applications used to receive user audio input and provide feedback, such as a list of questions, are executed on the server 110 (e.g., applications 122) and be provided via an online service. In some implementations, web applications communicate via the network 150 with a user agent 132, such as a browser, executing on the client device 130. The user agent 132 may provide a user interface that allows the user to interact with applications 122 and may enable applications 122 to provide user data to the speech assistance service 114 for processing via the application cast service 120. In other examples, applications used to receive user audio input and provide feedback maybe local applications such as the applications 134 that are stored and executed on the client device 130 and provide a user interface that allows the user to interact with the application 134. User data from applications 134 may also be provided via the network 150 to the speech assistance service 114 for use in providing speech rehearsal assistance.

Figure 1B:
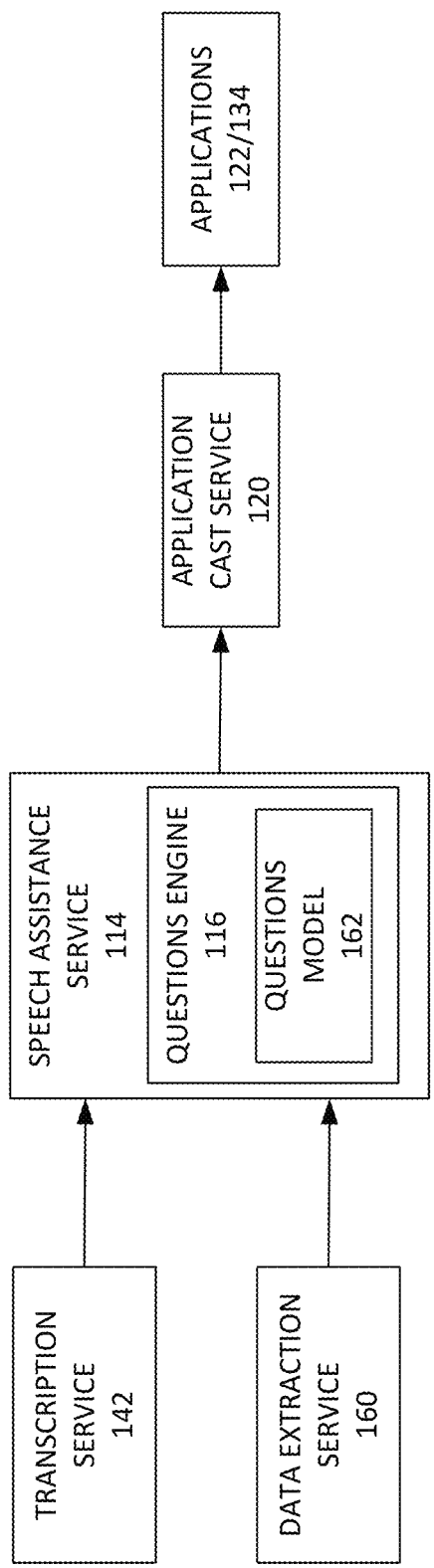
FIG. 1B depicts an example data flow between some elements of an example system upon which aspects of this disclosure may be implemented.

FIG. 1B depicts an example data flow between some of the elements of an example system 100 upon which aspects of this disclosure may be implemented. In some implementations, the speech assistance service 114 receives audio transcription data from the transcription service 142. As discussed above, the transcription data may be received directly from the transcription service 142 or it may be provided to transcription interface. The transcription data may be provided in batches. When the presentation session includes other data such as presentation materials, a data extraction service 160 may be utilized to extract other data relating to the presentation session. The other data may include content of the presentation materials (e.g., text or multimedia content of slides of a presentation), content of documents shared in a meeting (e.g., an image shared by the presenter during a meeting) or the like. The data extraction service 160 may include one or more ML models for examining additional documents related to the presentation (e.g., presentation content, documents shared, etc.) and extracting data from those documents that relates to the presentation.

The transcription data and additional data may be provided to the speech assistance service 114 for processing. The speech assistance service 114 may provide the received data to the questions engine 116, which may in turn provide the data to the questions model 162. The questions model 162 may include an unsupervised natural language generation (NLG). The NLG may be a transformer model trained by using a large training data set of textual data for learning correlations between different text segments. Once trained, the NLG may generate different types of natural language output based on the type of input provided to it. To ensure that the questions model 162 generates questions that may be asked by an audience during a presentation, the questions engine 116 may generate a prompt that includes data relating to the presentation session (e.g., transcript data and other data) and/or history data from previous presentation sessions (e.g., previous questions and responses) for providing to the questions model 162. The prompt may be a carefully crafted script that allows the NLG model to perform zero-shot adaptation in real time to the problem at hand without the need for any additional training data. This is because an NGL has learned a significant amount of high-level correlations between text. As a result, when it is prompted with data relating to questions that can be asked during a live presentation and the beginning of another question, it may be able to generate the question. In some implementations, a prompt script is created (e.g., either manually or automatically) for use in generating prompts. The prompt script may include blank spaces that are filled with data related to the presentation session to create the prompt for the session.

In some implementations, each prompt to the questions model 162 results in one question. Thus, the audio data from the rehearsal session or live meeting may be parsed into separate portions and provided to the questions model 162 in batches. In some implementations, the audio data is parsed based on a determination that there is a pause, a change of topic in the presentation, or a request from the user. This may be determined in a variety of different manners. For example, based on an audio cue from the user (e.g., a pause or a specific request for questions), a built-in timer (e.g., based on randomly selected time intervals), or a detector ML model that detects changes in topic and/or other factors that may indicate an appropriate breaking point in the audio data.

In addition to generating questions, the questions model 162 may also receive input data relating to responses the user provides to questions, evaluate the responses and determine whether the response is appropriate for the question. This may be achieved by providing audio data of the response to the speech assistance service 114 which may in turn transfer the data to the questions engine 116. The questions engine 116 may generate a prompt using the audio data of the response, the text of the question, data relating to previous questions and responses and/or other factors and transmit the prompt to the questions model 162 for evaluation. In some implementations, the questions model 162 may generate one or more scores relating to relevance of the response to the questions, length of the response, clarity of the response, tone of the response and the like. The one or more scores may be combined together to generate a final evaluation score. When the final evaluation score meets a threshold number (e.g., exceeds a predetermine threshold score), the response may be identified as being responsive to the questions. In some implementations, the separate scores may be used to provide individual feedback regarding the various qualities of the response. For example, feedback may be provided that indicates the response was too short or too long, the tone was improper, it was unclear and/or it was unrelated to the question. In some implementations, evaluating responses to the questions may be done by one or more other models. Furthermore, in addition to evaluating the quality of the response, one or more other speech models may be used to evaluate the pace, disfluency, existence of filler words and the like in the response. These models may operate as discussed in U.S. Publication No. 2021/0065582 A1, which is incorporated by reference herein in its entirety.

Once the questions are generated and/or the evaluation scores have been calculated, the questions model 162 may return the one or more questions and/or evaluation results to the application cast service 120 which may in turn provide the results to the applications 122/134 for display to the user.

Figure 2A:
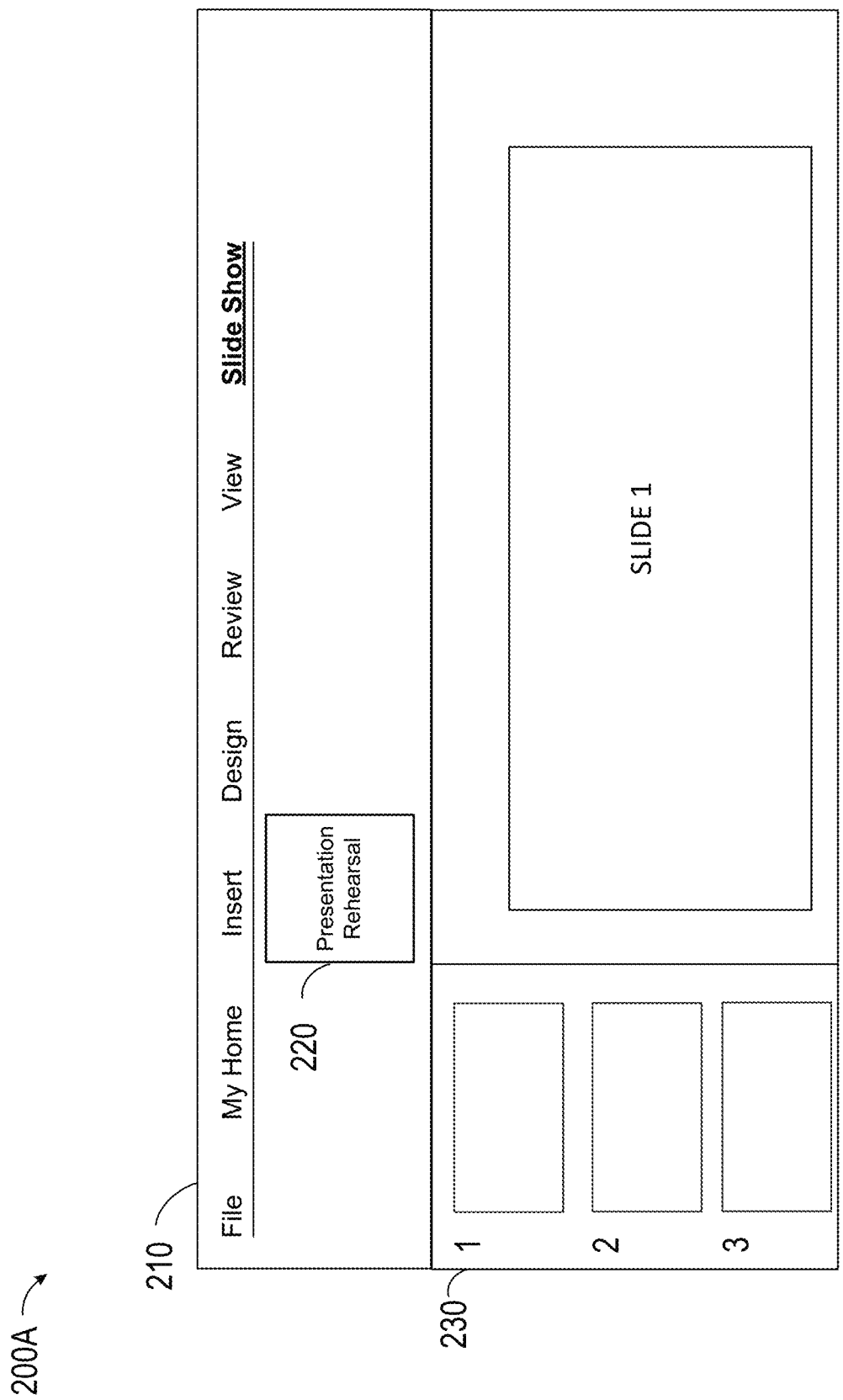

FIG. 2A depicts an example user interface (UI) screen 200A for an application or service that provides speech or presentation rehearsal. The UI screen 200A of FIG. 2A may for example be displayed by a presentation application that is also used for preparing presentation materials (e.g., digital presentation slides) for display during a presentation. In an example, the UI screen 200A of the presentation application or service may include a toolbar menu 210 that may display multiple tabs for providing various menu options. The UI screen 200A may also include a content pane 230 which may contain one or more sections. In an example, the content pane 230 may include a section for displaying thumbnails of the slides in the presentation and a section for displaying in a larger size a selected slide from among the slides shown on the left.

One of the tabs of the toolbar menu 210, such as the Slide Show tab selected in the UI screen 200 may include a UI element such as menu option 220 for launching a presentation rehearsal session. Selecting the menu option 220 may result in entering a presentation rehearsal mode where the slides are shown in a full screen mode on a display screen associated with the client device and an environment is provided to begin a presentation rehearsal session. In one implementation, entering the presentation rehearsal session may cause the client device to begin capturing (e.g., by a microphone), processing, and/or transmitting audio data for providing feedback to the user. It should be noted that although the launch presentation rehearsal option is shown as being part of a menu option of a menu toolbar, any other UI element may be used to begin a presentation rehearsal session. Furthermore, although the launch presentation rehearsal option is displayed as being a part of a presentation application, it does not have to be. Any other application or service that can capture audio data and provide a display screen for displaying feedback regarding the user's speech may be used.

FIG. 2B illustrates an example UI screen 200B of an application during a presentation rehearsal session. The UI screen 200B may for example be displayed by the presentation application of FIG. 2A once the user selects the presentation rehearsal option 220 and begins speaking. In an example, once the rehearsal session begins and some audio data is received from the application indicating that the user has begun practicing, data relating to the presentation (e.g., content of the slide) along with the audio data may be provided to a speech assistance service to transmit to a question engine for generating potential questions. When one or more potential questions are generated, a UI element 240 (e.g., a pop-up menu) may be displayed on the UI screen 200B to present the potential questions relating to the current content (e.g., current slide) in real-time to the user. In this manner, while the user is actively engaged in the rehearsing the presentation, they are able to see potentially relevant questions and prepare for them. In some implementations, an option may be provided to users to turn off display of potential questions during the rehearsal if they are not interested in exploring them and/or if they find them distracting. It should be noted that the UI element 240 is an example UI feature many other configurations for presenting the questions to the user may be utilized. For example, the question may be provided by audio output. In another example, the questions may be presented on a separate screen from the presentation screen. Other configurations are also possible.

Once the user notices the UI element 240, they may be interested in providing a practice response to the question to have their response evaluated. To do so, the user may select the UI element 242. When more than one potential question has been generated, the UI element 240 may display a UI element 244 for enabling the user to view the next question. Selecting the UI element 244 may result in the display of a different question on the UI element 240 for which the user can select the UI element 242 to begin practicing a response. In some implementations, the UI element 240 includes a UI element for closing the UI element when the user is not interested in viewing the questions. This may be provided by an ignore menu button on the UI element 240 or another UI element that enables the user to close the UI element 240.

When the user selects the UI element 244 to initiate providing a response, the UI element 244 may change to a UI element that allows the user to indicate an end to the practice (e.g., pause or stop button for stopping the practice). In some implementations, once the UI element 244 to begin practicing has been selected, more UI elements are displayed on the UI element 240 or UI screen 200B to allow the user to pause and/or stop the practice. Once the user indicates that they have finished providing their response (e.g., selecting a stop button), the audio data relating to the response may be transmitted from the application to the speech assistance service to analyze the response for responsive, clarity, tone, pitch, pace, disfluency, and/or other features.

Figure 2C:
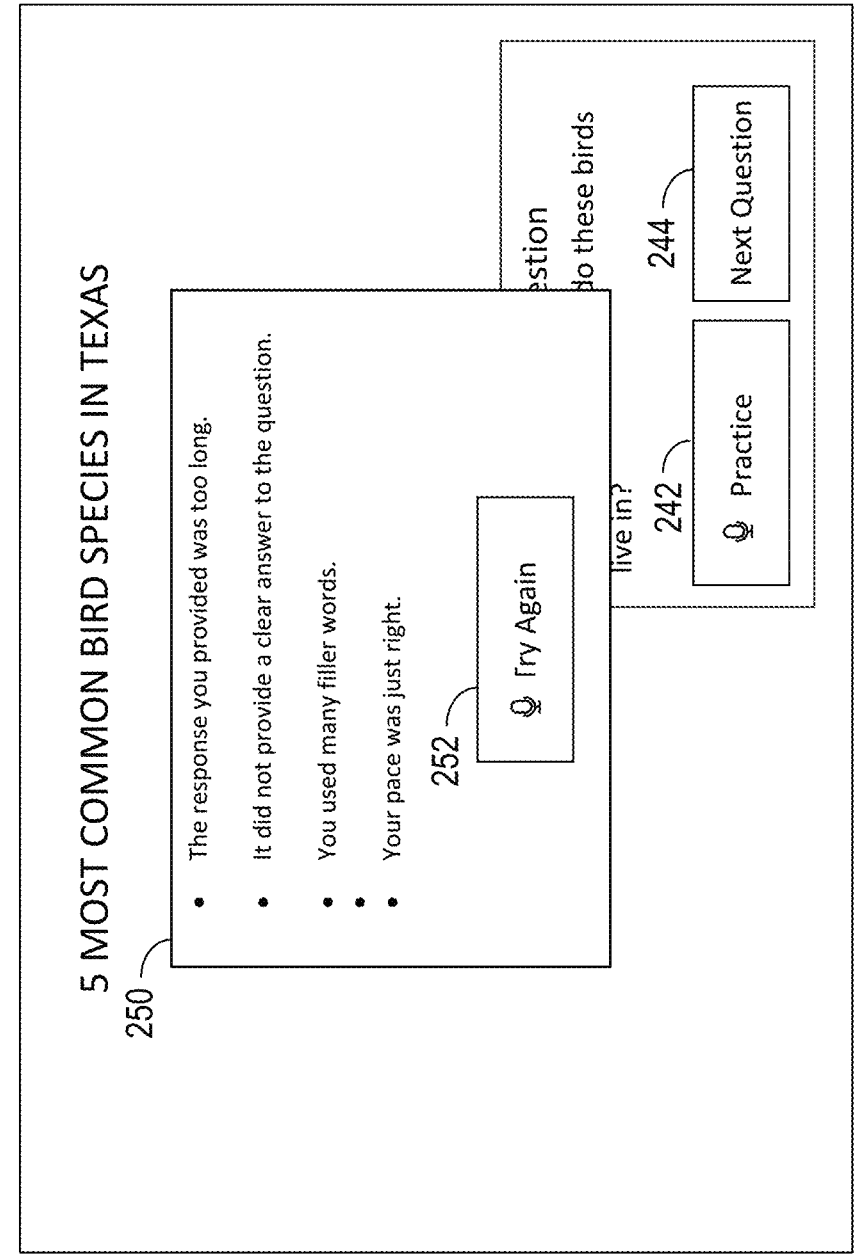

Once the response is evaluated, a UI element may be displayed that provides the results of the evaluation. FIG. 2C depicts an example UI screen 200C displaying example response evaluation results. The evaluation results may be presented in a UI element 250 (e.g., a pop-up menu) and may include one or more features identified as either meeting a required threshold and/or not meeting the required threshold. For example, the results may indicate that the response did not provide a clear answer to the question or that it was too long. Furthermore, the results may provide positive feedback such as the pace being appropriate or normal. The UI element 250 may include a UI element 252 for enabling the user to try practicing again to improve their response. Once selected, the UI element 252 may turn into a UI element that enables the user to pause or stop the practice, at which point the new practice may be evaluated and the updated results may be displayed in the UI element 250.

Figure 2D:
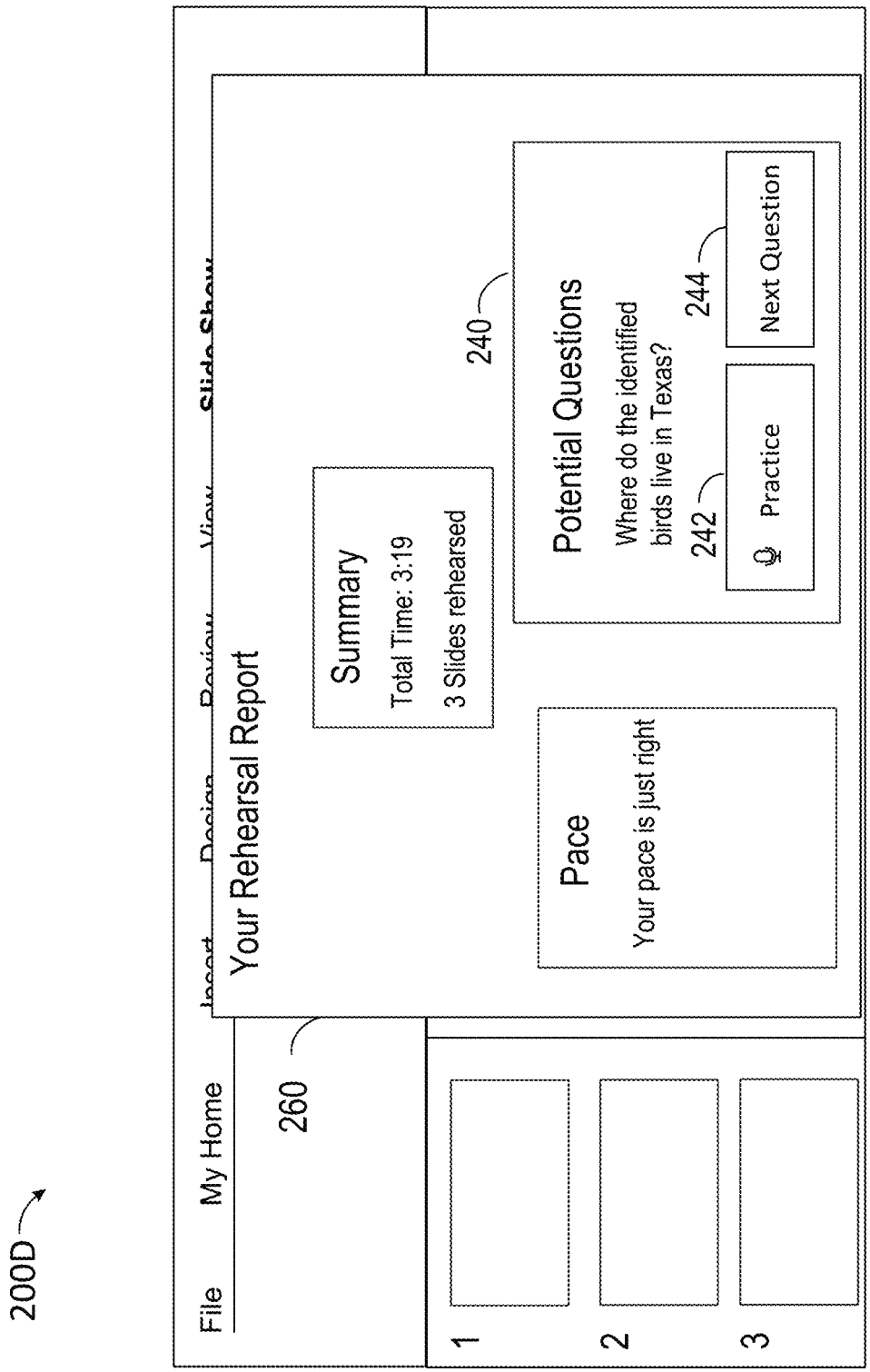

In some implementations, in addition to the questions provided in real-time, a list of one or more questions may be made available in a summary report after the rehearsal session is complete. The summary report may provide an overall assessment of the users' performance and may include a list of one or more questions relating to the presentation as well as information such as the overall pace of speaking, the number and list of most frequently used filler words, the number of times the user was disfluent, the total time used for rehearsal, and the like. FIG. 2D depicts an example UI screen 200D displaying a summary report for a presentation rehearsal session. The summary report may be displayed via a UI element 260. Alternative configurations for displaying the summary report are also contemplated. For example, a text document providing the report may be provided for viewing, downloading and/or storing for future reference.

In some implementations, the UI element 260 may be displayed automatically when the application receives an indication that the presentation session has ended. This may occur for example, when the user exits the presentation mode. In another example, a link for the summary report may be provided upon exiting the presentation, upon selection of which the report may be displayed. The summary report may include a UI element 240 for displaying potential questions relating to the presentation. As discussed above, the UI element 240 may list one question and allow the user to practice providing a response by selecting the UI element 242. In some implementations, an indication may be provided in the UI element 240 of the UI screen 200D as to what portion of the presentation the list question relates to (e.g., the slide number the question relates). This may enable the user to go back to the slide to gather additional information and/or be informed of the context of the question. In some implementations, the UI element 240 may display more than one question at a time. In such an implementation, a UI element may be provided to enable the user to select which of the displayed questions the user desires to practice providing a response for. As a result, the technical solution provides a method for enabling the user to anticipate questions during a speech rehearsal session and practice response to such questions to increase the quality of a person's speech or presentation.

Figure 3A:
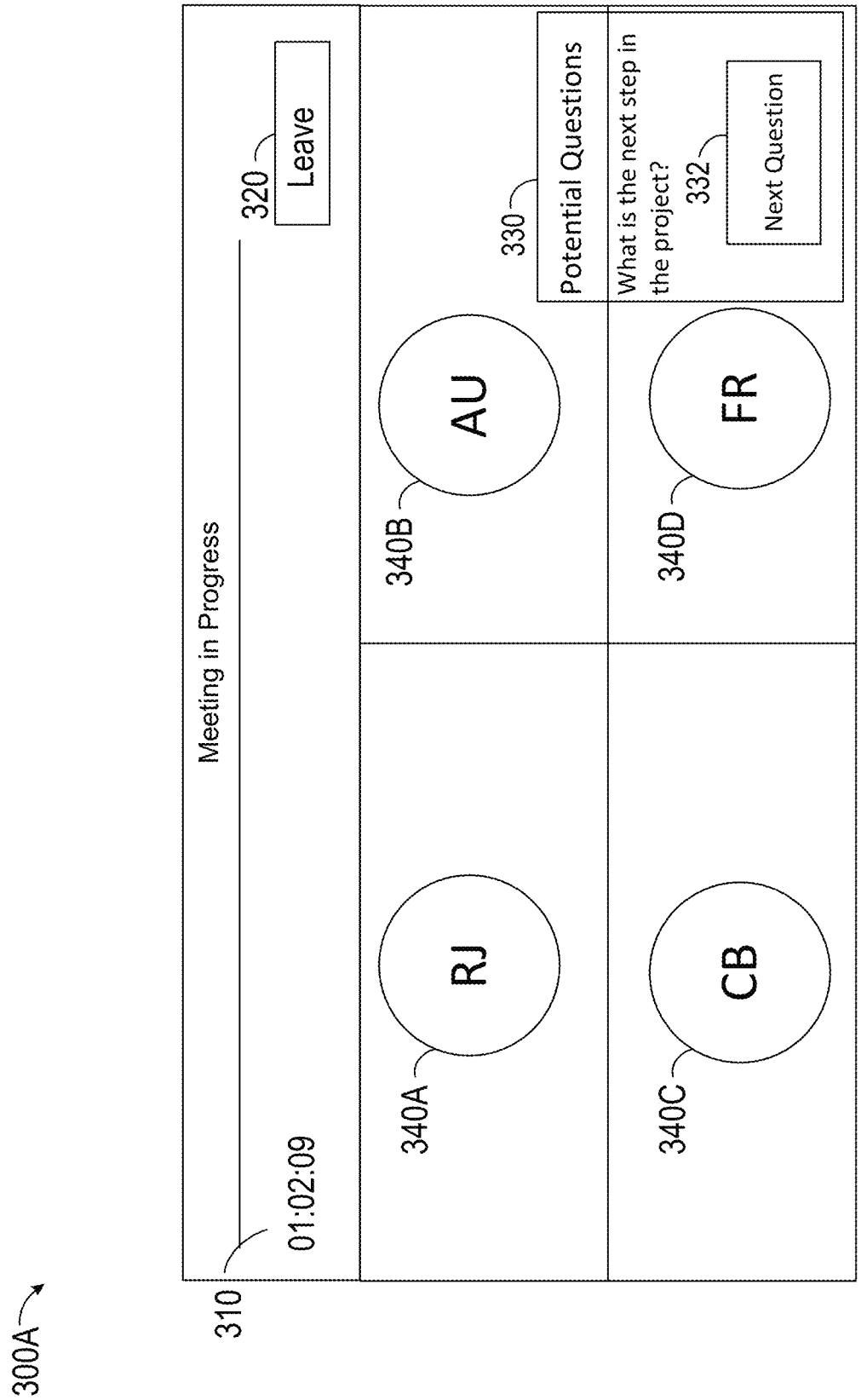
FIGS. 3A-3B depicts example UI screens for an application or service that provides virtual meeting capabilities.
Figure 3B:
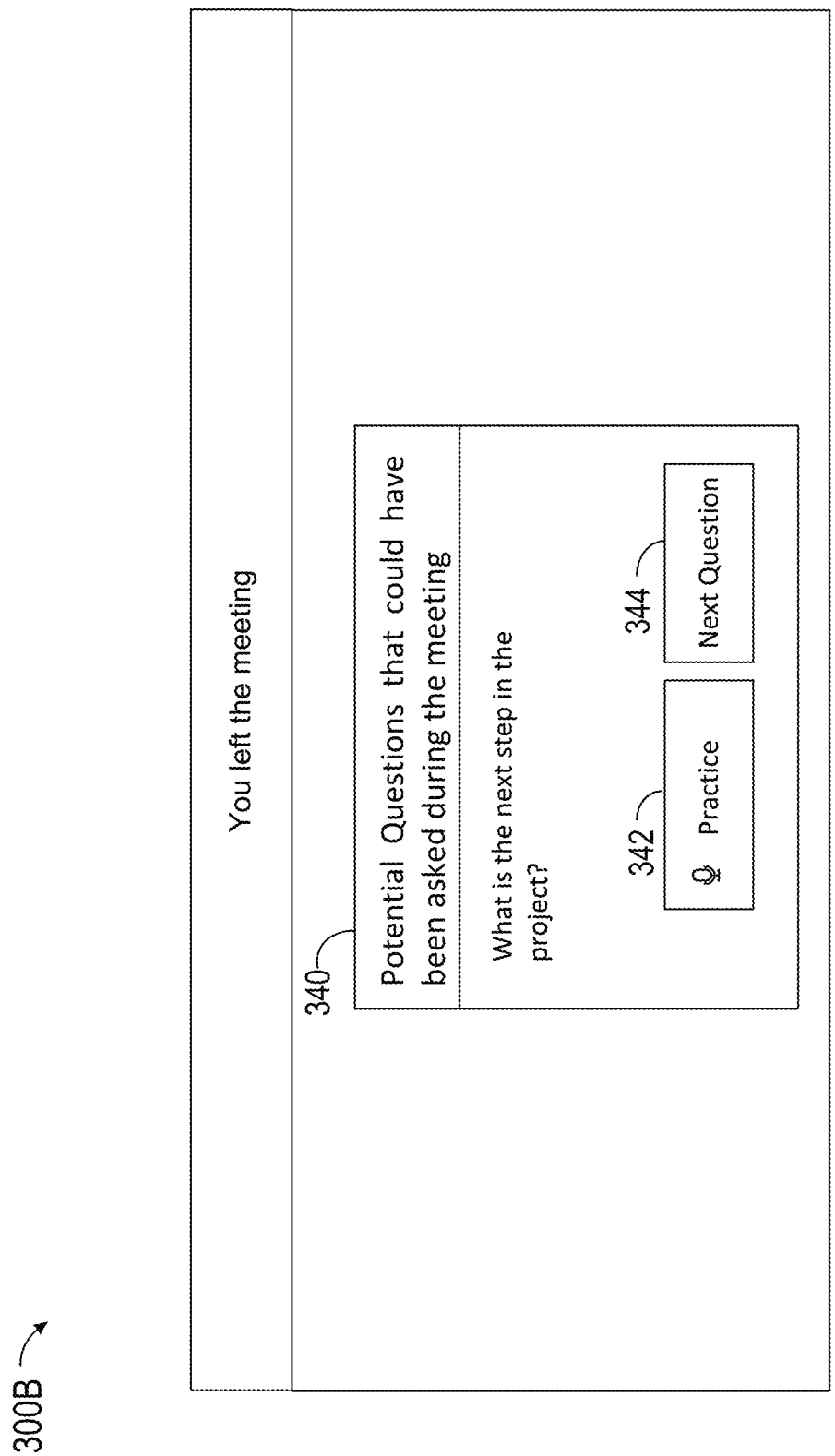

FIGS. 3A-3B depicts example UI screens for an application or service that provides virtual (e.g., audio/video) meeting capabilities. The UI screen 300A of FIG. 3A may include one or more UI elements providing various menu options for the virtual meeting application. For example, a UI element 310 may display a time indicating how long the virtual meeting has been occurring and a UI element 320 for leaving the meeting. In some implementations, the UI screen 300A may display various icons 340 (340A-340D) for each of the participants in the meeting. While the meeting is in progress (e.g., when one of the participants is speaking), a UI element 330 may be displayed to present a question that can be asked at this point in the meeting. This may be displayed to all participants in the meeting, only to the speaker, or only to those participants that have indicated that they are interested in seeing potential questions. In some implementations, this feature may be enabled by each participant in the meeting. For example, the participants may be able to enable the feature from the UI screen of their application. In other implementations, the ability to enable the feature may only be available to the person who scheduled the meeting or the main presenter. In such implementations, the other participants may be able to turn off the feature if they do not wish to view the questions and/or find them distracting. Furthermore, the UI element 330 may include a UI option for closing the UI element 330 such that it is removed from the screen 300A. Additionally, the UI element 330 may include a UI element 332 for viewing the next question in the list of questions.

Display of potential questions during a meeting may provide multiple advantages. For example, when questions are shown to multiple meeting participants, the questions may help stimulate conversation or lead to a discussion of topics that are helpful to the participants. When the questions are only shown to the presenter, they may provide an opportunity to the presenter to prepare for questions that may be asked by the participants and/or enable the presenter to cover the topics mentioned by questions such that they provide an answer to potential questions before the questions are asked.

It should be noted that processing audio data from a meeting may be different from processing audio data from a rehearsal session because during a meeting audio data may be provided by multiple individuals. In order to process that data properly, the audio data from each individual may be tagged with an ID for the individual before the audio data is transmitted to the questions engine and/or questions model. By examining the IDs, the questions model may be able to determine the flow of the conversation, determine how the discussions are related and generate questions that relate to the overall conversation occurring at the meeting.

In some implementations, once a user leaves the meeting and/or the meeting ends, a post meeting UI screen such as the UI screen 300B of FIG. 3B may be displayed to the user. The screen 300B may include a UI element 340 for presenting one or more questions that could have been asked during the meeting. In some implementations, the questions are only questions that relate to the user's portion of the audio data (e.g., to what the user spoke about) and as such may be questions that could have been asked from the user during the meeting. In other implementations, the questions may include questions that could have been asked of any participants in the meeting (e.g., they relate to the overall discussion in the meeting). The UI element 340 may display the potential questions one at a time, while providing a UI element 342 for practicing a response to the question and a UI element 344 for viewing the next question. As discussed above, when the UI element 342 is selected, audio data may be collected from the user and analyzed to evaluate the user's response. Once evaluation is complete a UI element such as the UI element 250 of FIG. 2C may be displayed to provide feedback to the user. This may enable the user to practice responding to questions, determine areas that need improvement, improve their speaking abilities and as such prepare for future meetings.

Figure 4:
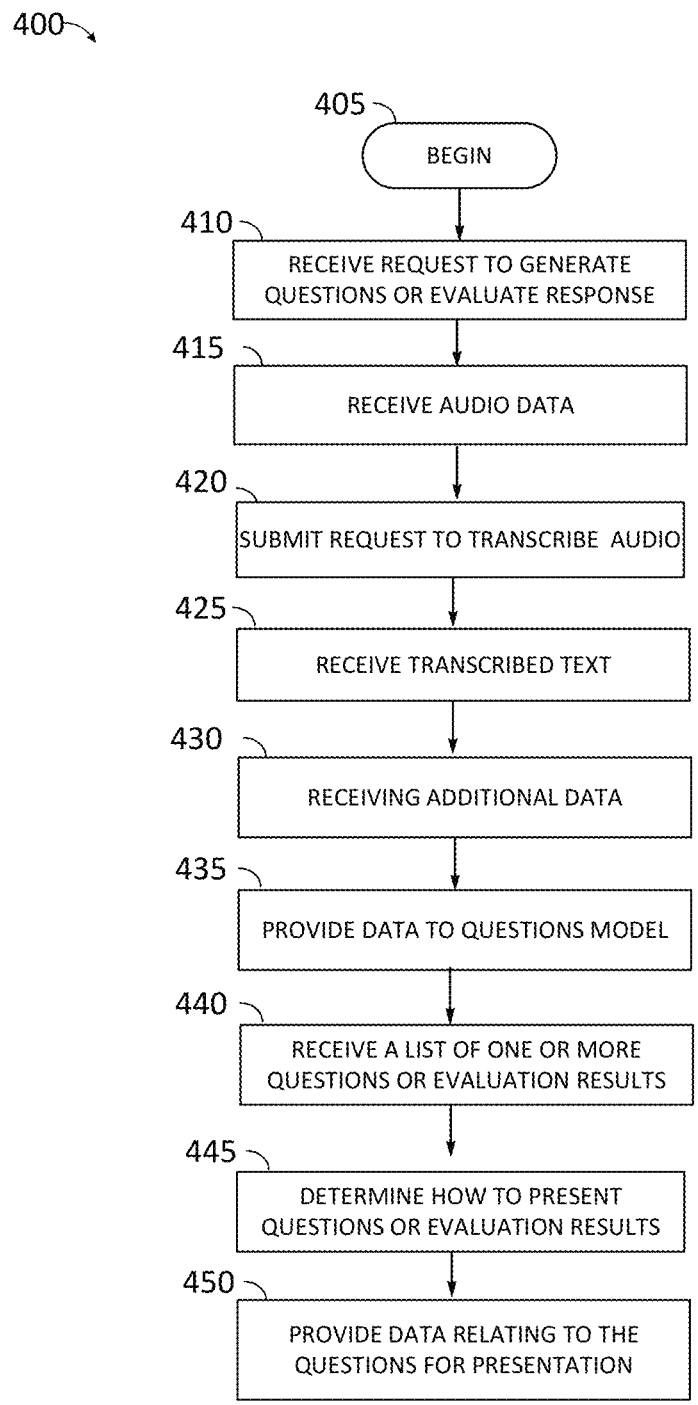
FIG. 4 is a flow diagram depicting an example method for generating one or more questions relating to a presentation session.

FIG. 4 is a flow diagram depicting an exemplary method 400 for automatically generating questions relating to a presentation session. One or more steps of the method 400 may be performed by a speech assistance service, questions model or data extraction model. The method 400 may begin, at 405, and proceed to receive a request for generating questions relating to a presentation session or evaluating a response to a question, at 410. This may occur, for example, when a user provides an input via a UI of an application or service that provides speech rehearsal assistance or virtual meeting indicating that he/she desires to view questions relating to the rehearsal session or virtual meeting during the session. Alternatively, the request may be transmitted automatically when a user begins the rehearsal session or virtual meeting. The input may be provided via a client device and be transmitted via a network to a speech assistance service.

Once a request for generating questions or evaluating a response is received, the program or online service via which rehearsal assistance is being provided may begin receiving audio data from the client device, at 415. The audio data may be captured by an input device such as a microphone connected to a client device. The client device may in turn transfer the audio data to an application cast service or directly to the speech assistance service for further processing. Once audio data is received, a request to transcribe the audio data may be submitted from the application cast service and/or service speech assistance service) to a speech recognition engine for converting the spoken words to text, at 420. Speech recognition engines are known in the art and as such any known speech recognition mechanism that provides real-time speech recognition and conversion may be used.

In response to the request, transcribed text corresponding to the audio data may be received, at 425. The transcribed text may be provided to the speech assistance service in real-time as the user is speaking. In one implementation, the information relating to the transcribed text may include metadata such as an ID for the person whose spoke words were transcribed, a time when the text is received and the duration of the speech results. In addition to the transcribed text, method 400 may also include receiving additional data relating to the presentation session, at 430. The additional data may include content of the presentation session, for example from documents used during the presentation (e.g., slides of a presentation or documents shared in a virtual meeting). The content may be extracted by using one or more ML models and transmitted to the speech assistance service for processing. The additional data may also include data from previous presentation sessions such as data relating to previous questions generated and responses evaluated.

Once the required data is received, method 400 may proceed to provide the data to a questions model, at 435. This may involve generating an appropriate prompt that includes the data received in a format that when provided to the questions model results in generation of a question relating to the data or evaluating a response, as needed. After the input data is provided to the questions model, method 400 may proceed to receive a list of one or more questions or evaluation results of a response from the questions model, at 440. The evaluation results may include one or more scores relating to the responsiveness, tone, clarity and/or speech parameters of the response.

Once the generated questions or evaluation results are received, method 400 may proceed to determine how to present the questions or evaluation results at 445. This may involve determining whether a user request to view the questions during the presentation has been received or whether the user has chosen to view the questions at the end of the presentation. Furthermore, when dealing with evaluation results, method 400 may determine which ones of the results should be presented. This may involve, for example, identifying evaluation scores that meet a desired threshold or fall outside of a desired threshold and determining which ones would be relevant or useful to the user. Method 400 may then proceed to provide data relating to the questions or evaluation results to the application cast service or directly to the application for display, at 450. The data may include the list of questions, the evaluation results and/or the proper way for displaying the questions or evaluation results.

Figure 5:
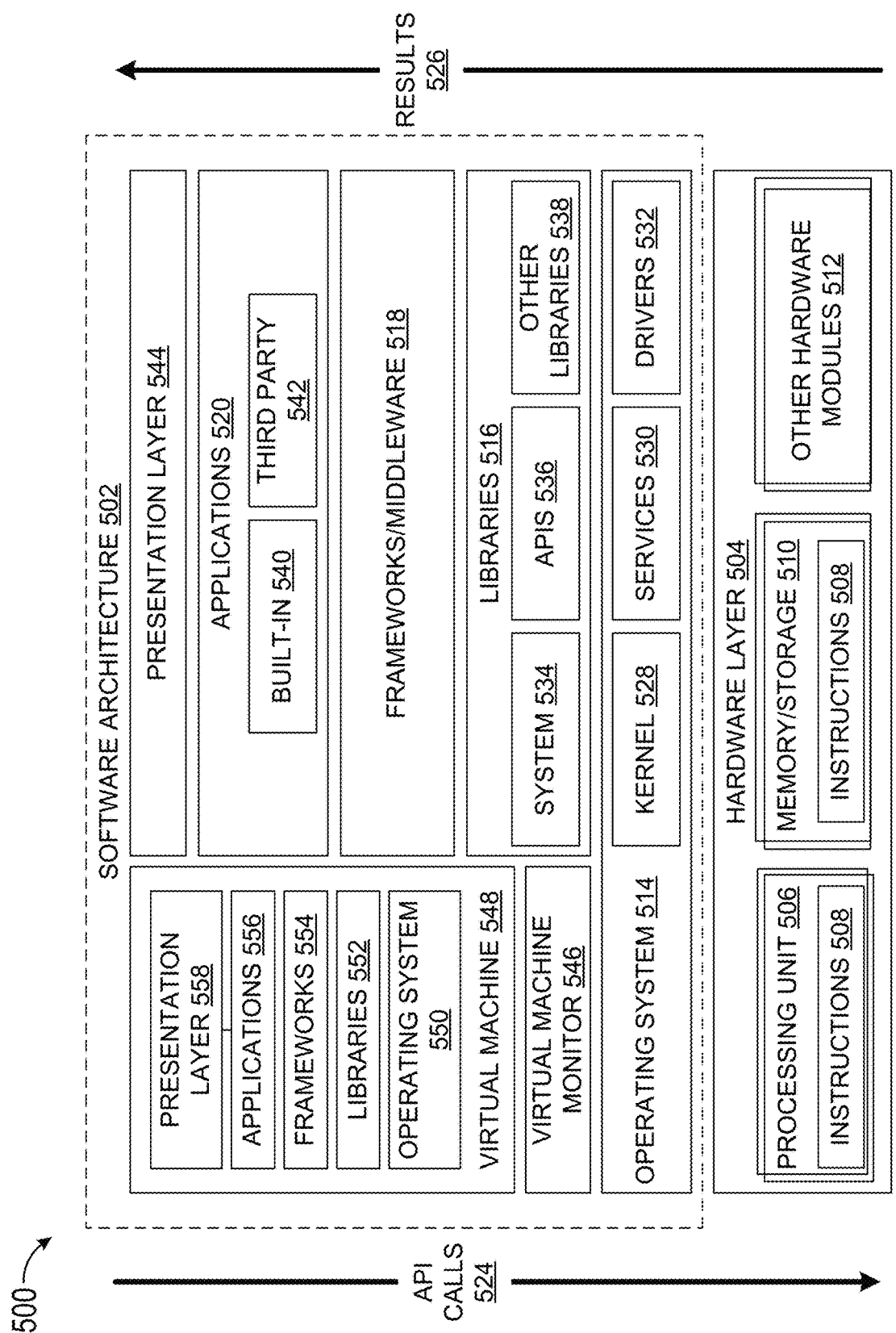
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
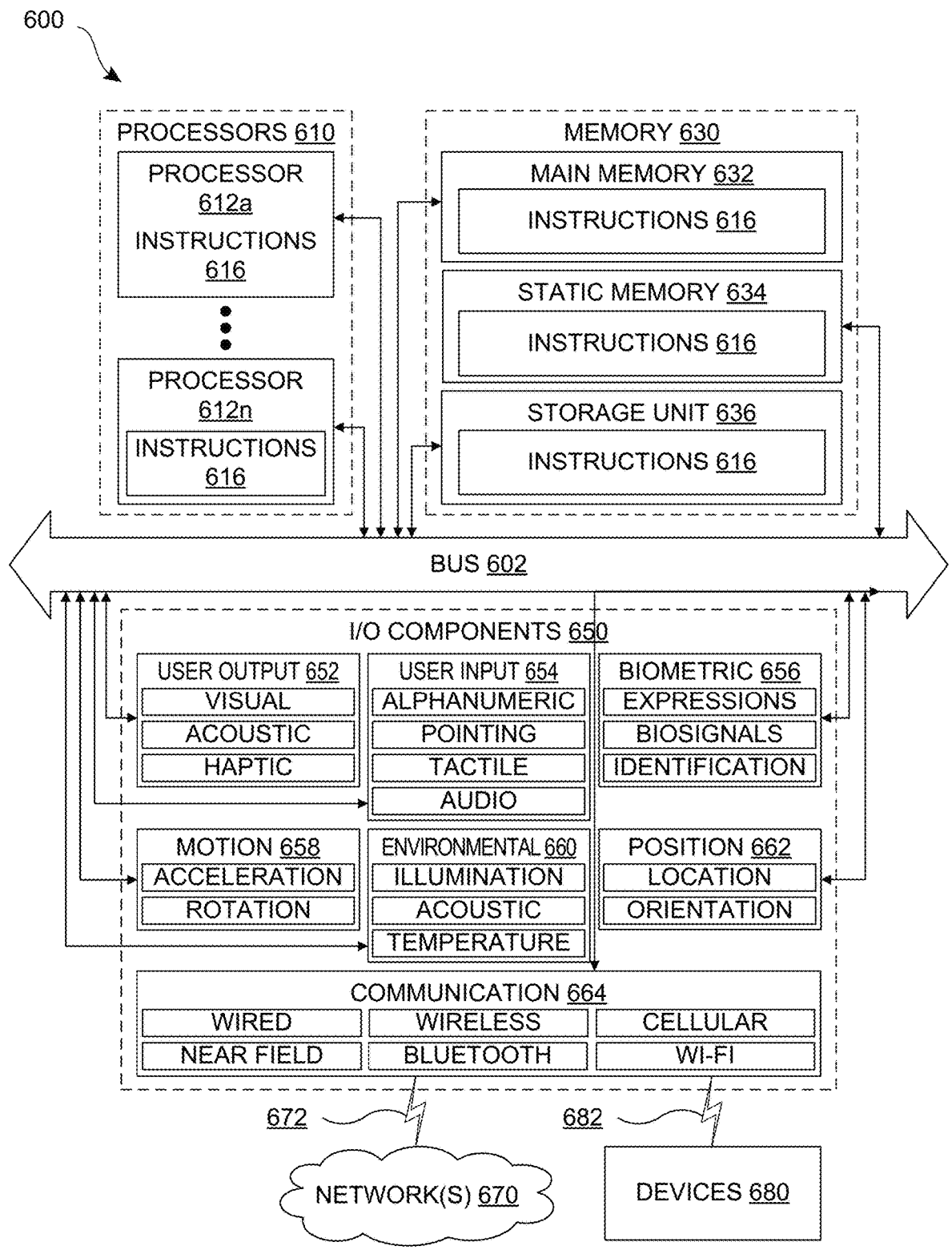
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving audio data from a presentation session;
retrieving a transcript for the audio data;
receiving other data relating to the presentation session;
providing at least one of the transcript and the other data to a machine-learning (ML) model as input for automatically generating one or more questions relating to the presentation session;
receiving from the ML model the one or more questions; and
providing the one or more questions for display on a user interface associated with the presentation session.

Item 2. The data processing system of item 1, wherein the other data includes as least one of content of a presentation document, multimodal content, content of a document shared during the presentation session or one or more questions from a previous presentation session.

Item 3. The data processing system of items 1 or 2, wherein the presentation session is at least one of a speech rehearsal session or a virtual meeting.

Item 4. The data processing system of any preceding item, wherein the audio data is received in real time while the presentation session is occurring.

Item 5. The data processing system of any preceding item, wherein the one or more questions are displayed in real time during the presentation session.

Item 6. The data processing system of any preceding item, wherein the user interface includes a UI element for receiving a response to the one or more questions from a user.

Item 7. The data processing system of item 6, wherein the audio data includes data relating to the response and the executable instructions, when executed by the processor, further cause the data processing system to perform functions of:
providing at least one of the transcript and the other data to a machine-learning (ML) model as input for evaluating the response;
receiving from the ML model one or more evaluation results for the response; and
providing the one or more evaluation results for display on the user interface associated with the presentation session.

Item 8. The data processing system of item 7, wherein the evaluation results include at least one of a first indication of responsiveness of the response, a second indication of clarity of the response, a third indication of a length of the response, a fourth indication of a pace of the response.

Item 9. A method for generating one or more questions relating to a presentation session comprising:
receiving audio data from the presentation session;
retrieving a transcript for the audio data;
receiving other data relating to the presentation session;
providing at least one of the transcript and the other data to a machine-learning (ML) model as input for automatically generating the one or more questions relating to the presentation session;
receiving from the ML model the one or more questions; and
providing the one or more questions for display on a user interface associated with the presentation session.

Item 10. The method of item 9, wherein the other data includes as least one of content of a presentation document, multimodal content, content of a document shared during the presentation session or one or more questions from a previous presentation session.

Item 11. The method of items 9 or 10, wherein the presentation session is at least one of a speech rehearsal session or a virtual meeting.

Item 12. The method of any of items 9-11, wherein the audio data is received in real time while the presentation session is occurring.

Item 13. The method of any of items 9-12, wherein the one or more questions are displayed in real time during the presentation session.

Item 14. The method of any of items 9-13, wherein the one or more questions are displayed after the presentation session is completed.

Item 15. The method of any of items 9-14, wherein the user interface includes a UI element for receiving a response to the one or more questions from a user.

Item 16. The method of item 15, wherein the audio data includes data relating to the response and the method further comprises:
providing at least one of the transcript and the other data to the ML model as input for evaluating the response;
receiving from the ML model one or more evaluation results for the response; and
providing the one or more evaluation results for display on the user interface associated with the presentation session.

Item 17. A non-transitory computer readable medium on which are stored instructions that, when executed, cause a programmable device to:
receive audio data from a presentation session;
retrieve a transcript for the audio data;
receive other data relating to the presentation session;
provide at least one of the transcript and the other data to a machine-learning (ML) model as input for automatically generating one or more questions relating to the presentation session;
receive from the ML model the one or more questions; and
provide the one or more questions for display on a user interface associated with the presentation session.

Item 18. The non-transitory computer readable medium of item 17, wherein the other data includes as least one of content of a presentation document, multimodal content, content of a document shared during the presentation session or one or more questions from a previous presentation session.

Item 19. The non-transitory computer readable medium of items 17 or 18, wherein the user interface includes a UI element for receiving a response to the one or more questions from a user.

Item 20. The non-transitory computer readable medium of item 19, wherein the audio data includes data relating to the response and the instructions when executed, further cause a programmable device to:
provide at least one of the transcript and the other data to the ML model as input for evaluating the response;
receive from the ML model one or more evaluation results for the response; and
provide the one or more evaluation results for display on the user interface associated with the presentation session.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor or another element, cause the data processing system to perform functions of:
   receiving audio data from a practice presentation session;
   retrieving a transcript for the audio data;
   receiving other data relating to the practice presentation session, the other data being extracted from content of presentation materials used to conduct the practice presentation session;
   generating, at a questions engine, a prompt to be provided as an input to a natural language generation (NLG) model, by utilizing a prompt script that includes blank spaces for inserting data relating to at least one of the transcript and the other data, wherein the prompt script allows the NLG model to perform zero-shot adaptation in real time, and the NLG model includes a model that receives the prompt and generates one or more questions that are likely to be asked during a live presentation session based on the transcript of the practice presentation session and the content of the presentation materials;
   providing the prompt to the NLG model as input for automatically generating the one or more questions;
   receiving from the NLG model the one or more questions;
   providing the one or more questions for display on a user interface associated with the practice presentation session; and
   training the NLG model using a training data set of textual data.

2. The data processing system of claim 1, wherein the other data includes as least one of content of a presentation document, multimodal content, content of a document shared during the presentation session or one or more questions from a previous presentation session.

3. The data processing system of claim 1, wherein the practice presentation session is at least one of a speech rehearsal session or a virtual meeting.

4. The data processing system of claim 1, wherein the audio data is received in real time while the practice presentation session is occurring.

5. The data processing system of claim 1, wherein the one or more questions are displayed in real time during the practice presentation session.

6. The data processing system of claim 1, wherein the user interface includes a UI element for receiving a response to the one or more questions from a user.

7. The data processing system of claim 6, wherein the audio data includes data relating to the response and the executable instructions, when executed by the processor, further cause the data processing system to perform functions of:
   providing at least one of the transcript and the other data to a second ML model as input for evaluating the response;
   receiving from the second ML model one or more evaluation results for the response; and
   providing the one or more evaluation results for display on the user interface associated with the practice presentation session.

8. The data processing system of claim 7, wherein the evaluation results include at least one of a first indication of clarity of the response, and a second indication of a length of the response.

9. A method for generating one or more questions relating to a presentation session comprising:
   receiving audio data from a practice presentation session;
   retrieving a transcript for the audio data;
   receiving other data relating to the practice presentation session, the other data being extracted from content of presentation materials used to conduct the practice presentation session;
   generating, at a questions engine, a prompt to be provided as an input to a natural language generation (NLG) model, by utilizing a prompt script that includes blank spaces for inserting data relating to at least one of the transcript and the other data wherein the prompt script allows the NLG model to perform zero-shot adaptation in real time, and the NLG model includes a model that receives the prompt and generates one or more questions that are likely to be asked during a live presentation session based on the transcript of the practice presentation session and the content of the presentation materials;
   providing the prompt to the NLG model as input for automatically generating the one or more questions;
   receiving from the NLG model the one or more questions;
   providing the one or more questions for display on a user interface associated with the practice presentation session; and
   training the NLG model using a training data set of textual data.

10. The method of claim 9, wherein the other data includes as least one of content of a presentation document, multimodal content, content of a document shared during the presentation session or one or more questions from a previous presentation session.

11. The method of claim 9, wherein the practice presentation session is at least one of a speech rehearsal session or a virtual meeting.

12. The method of claim 9, wherein the audio data is received in real time while the practice presentation session is occurring.

13. The method of claim 9, wherein the one or more questions are displayed in real time during the practice presentation session.

14. The method of claim 9, wherein the one or more questions are displayed after the practice presentation session is completed.

15. The method of claim 9, wherein the user interface includes a UI element for receiving a response to the one or more questions from a user.

16. The method of claim 15, wherein the audio data includes data relating to the response and the method further comprises:
   providing at least one of the transcript and the other data to a second ML model as input for evaluating the response;
   receiving from the second ML model one or more evaluation results for the response; and
   providing the one or more evaluation results for display on the user interface associated with the practice presentation session.

17. A non-transitory computer readable medium on which are stored instructions that, when executed, cause a programmable device to:

receive audio data from a practice presentation session;
retrieve a transcript for the audio data;
receiving other data relating to the practice presentation session, the other data being extracted from content of presentation materials used to conduct the practice presentation session;
generating, at a questions engine, a prompt to be provided as an input to a natural language generation (NLG) model, by utilizing a prompt script that includes blank spaces for inserting data relating to at least one of the transcript and the other data wherein the prompt script allows the NLG model to perform zero-shot adaptation in real time, and the NLG model includes a model that receives the prompt and generates one or more questions that are likely to be asked during a live presentation session based on the transcript of the practice presentation session and the content of the presentation materials;
providing the prompt to the NLG model as input for automatically generating the one or more questions;
receive from the NLG model the one or more questions;
provide the one or more questions for display on a user interface associated with the practice presentation session; and training the NLG model using a training data set of textual data.

18. The non-transitory computer readable medium of claim 17, wherein the other data includes as least one of content of a presentation document, multimodal content, content of a document shared during the presentation session or one or more questions from a previous presentation session.

19. The non-transitory computer readable medium of claim 17, wherein the user interface includes a UI element for receiving a response to the one or more questions from a user.

20. The non-transitory computer readable medium of claim 19, wherein the audio data includes data relating to the response and the instructions when executed, further cause a programmable device to:
provide at least one of the transcript and the other data to a second ML model as input for evaluating the response;
receive from the second ML model one or more evaluation results for the response; and
provide the one or more evaluation results for display on the user interface associated with the practice presentation session.

* * * * *